UNITED STATES PATENT OFFICE.

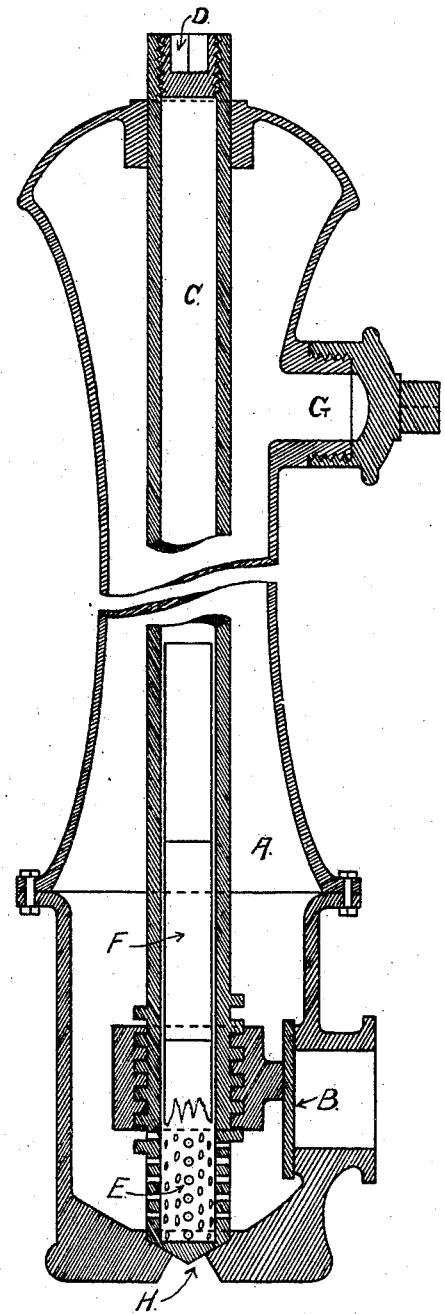

CARLETON ELLIS, OF BOSTON, MASSACHUSETTS, ASSIGNOR OF TWO-FIFTHS TO SAWYER, FOSTER AND HARDY, OF BOSTON, MASSACHUSETTS, A COPARTNERSHIP.

NON-FREEZING HYDRANT.

No. 795,964.      Specification of Letters Patent.      Patented Aug. 1, 1905.

Application filed March 21, 1904. Serial No. 199,106.

*To all whom it may concern:*

Be it known that I, CARLETON ELLIS, of Boston, in the county of Suffolk and State of Massachusetts, have invented certain new and useful Improvements in Non-Freezing Hydrants, of which the following is a specification.

The accumulation of water in hydrants and the difficulties arising in the winter season from the freezing of this water is a problem which hitherto has remained unsolved. The hydrant is frequently rendered inoperative thereby, and the consequent loss of property through the inability to extinguish a conflagration in its incipient stage is a common occurrence. The thawing of a frozen hydrant is, furthermore, a tedious operation. Various devices, such as frost-cases and the like, intended to overcome the difficulty have been found inefficient.

It is the object of this invention to provide a non-freezing hydrant by the suitable introduction into the barrel of the hydrant of soluble chemicals which possess the property of lowering the freezing-point of water. Among the chemicals adapted for this purpose are common salt and calcium chlorid. The latter is to be preferred because of its ready solubility in water, the ease with which it may be cast into any desired form, the pronounced lowering of the freezing-point which it induces, and the absence of any corrosive action upon iron or bronze—metals entering largely into the construction of hydrants.

The chemical may be introduced into the hydrant in any suitable manner. In some forms of apparatus the chemical may simply be inserted through the hydrant-nozzle and allowed to fall to the bottom of the barrel until the cavity immediately above the drip-valve is filled. With most hydrants this method is, however, impracticable owing to the more or less complex nature of the water-valves.

For the use of chemicals in the most satisfactory manner my invention in its preferred embodiment consists of a hydrant containing a hollow shaft extending from the upper to the lower part of the hydrant-barrel, said shaft being perforated or open at its lower end and containing the charge of chemicals. For the sake of compactness this hollow shaft may be situated inside the hydrant-barrel and may conveniently be utilized as a valve-actuating device or "stem." At the top the shaft is closed by a removable cap or plug. The chemical filling the interior of the shaft is by means of the openings at the bottom in contact with the drip-water accumulating in the lower part of the hydrant, and thereby dissolving renders the water incapable of freezing.

To make my description clearer, reference is made to the accompanying drawing, which illustrates the preferred form of my invention.

The drawing shows a section of the hydrant, in which A is a barrel or stand-pipe; B, a water gate or valve; C, a hollow stem used as the receptacle for chemicals and as a valve-actuating device and having perforations at E; D, a removable plug.

F represents sticks of calcium chlorid.

G is a nozzle, and H is a drip-valve.

The calcium chlorid or other chemical is charged into C at D until the stem is nearly filled. The plug D is then replaced. As the chemical at E slowly dissolves fresh portions drop down to replace that which has gone into solution. This continues until the charge is exhausted. The hydrant should be tested at intervals by inserting a long rod into the stem at D. In this way the quantity of chemical still undissolved is ascertained.

By my invention a hydrant which will not freeze in the coldest climates is made possible, and hence its use will avoid a large loss of property caused each winter by frozen hydrants.

What I claim as my invention, and desire to secure by Letters Patent, is—

A hydrant, having, in combination, a barrel through which the water passes, a valve controlling the supply of water to the barrel, a hollow valve-actuating stem located within the barrel and adapted to receive a soluble freezing-point-lowering chemical and provided with apertures near the base of the barrel, and a drip-valve, substantially as described.

In testimony whereof I have affixed my signature in presence of two witnesses.

CARLETON ELLIS.

Witnesses:
     HENRY C. SAWYER,
     SOPHIA WILSON.